United States Patent [19]
Uyehara et al.

[11] Patent Number: 6,154,214
[45] Date of Patent: Nov. 28, 2000

[54] DISPLAY ORIENTATION FEATURES FOR HAND-HELD CONTENT DISPLAY DEVICE

[75] Inventors: Lance Uyehara, Fremont; Martin F. Eberhard, Woodside; Marc E. Tarpenning, Palo Alto, all of Calif.

[73] Assignee: NuvoMedia, Inc., Mountain View, Calif.

[21] Appl. No.: 09/085,773

[22] Filed: May 28, 1998

Related U.S. Application Data

[60] Provisional application No. 60/078,782, Mar. 20, 1998.

[51] Int. Cl.[7] ........................ G06F 13/00
[52] U.S. Cl. ................... 345/358; 345/329; 345/348
[58] Field of Search ........................ 345/358, 329, 345/145–146, 348–349, 340–342, 352–355, 156, 173; 434/317, 307

[56] References Cited

U.S. PATENT DOCUMENTS

| | | |
|---|---|---|
| 4,160,242 | 7/1979 | Fowler et al. |
| 4,972,496 | 11/1990 | Sklarew . |
| 5,467,102 | 11/1995 | Kuno et al. |
| 5,663,748 | 9/1997 | Huffman et al. |
| 5,696,982 | 12/1997 | Tanigawa et al. |
| 5,774,109 | 6/1998 | Winksy et al. |
| 5,821,930 | 10/1998 | Hansen ..................................... 345/340 |
| 5,847,698 | 12/1998 | Reavey et al. |
| 5,889,516 | 3/1999 | Hickay et al. .......................... 345/333 |
| 5,897,324 | 4/1999 | Tan . |
| 5,909,207 | 6/1999 | Ho . |
| 5,914,707 | 6/1999 | Kono . |
| 5,914,718 | 6/1999 | Chiu et al. ............................... 345/358 |
| 5,986,665 | 11/1999 | Chiu et al. ............................... 345/349 |
| 5,990,865 | 11/1999 | Gard ........................................ 345/156 |
| 5,990,893 | 11/1999 | Numazaki ............................... 345/358 |
| 6,014,135 | 1/2000 | Fernandes ............................... 345/331 |
| 6,037,937 | 3/2000 | Beaton et al. ........................... 345/339 |
| 6,057,844 | 5/2000 | Strauss .................................... 345/358 |

*Primary Examiner*—Steven Sax
*Attorney, Agent, or Firm*—Townsend and Townsend and Crew LLP

[57] ABSTRACT

An electronic reading system is disclosed which allows users to download books and other types of content to a hand-held reader device for viewing. Using software which runs on a personal computer (PC), the user can download titles from Internet sites to the PC. Titles are then automatically transferred to the device when the device is placed in a cradle which is connected to the PC. Using the device's touch-sensitive display and graphical user interface, the user can access various software-implemented features associated with the display and management of the content. One feature is a user-definable hotkey that can be "dragged and dropped" onto a menu item to create a shortcut to that item. Another feature allows the user to tap twice on a displayed word to cause the device to look the word up in a pre-specified or default reference title, such as a dictionary or an encyclopedia. Another feature allows the user to block a passage on the touch-sensitive display and then specify one or more destinations (email addresses, file folders, fax numbers, printers, etc.) for routing the passage; when the device is subsequently placed in the cradle, the passage is automatically retrieved by the PC and routed to the specified destination(s). The device also implements a user interface feature for allowing the user to rapidly and conveniently adjust the orientation of the displayed title.

20 Claims, 15 Drawing Sheets

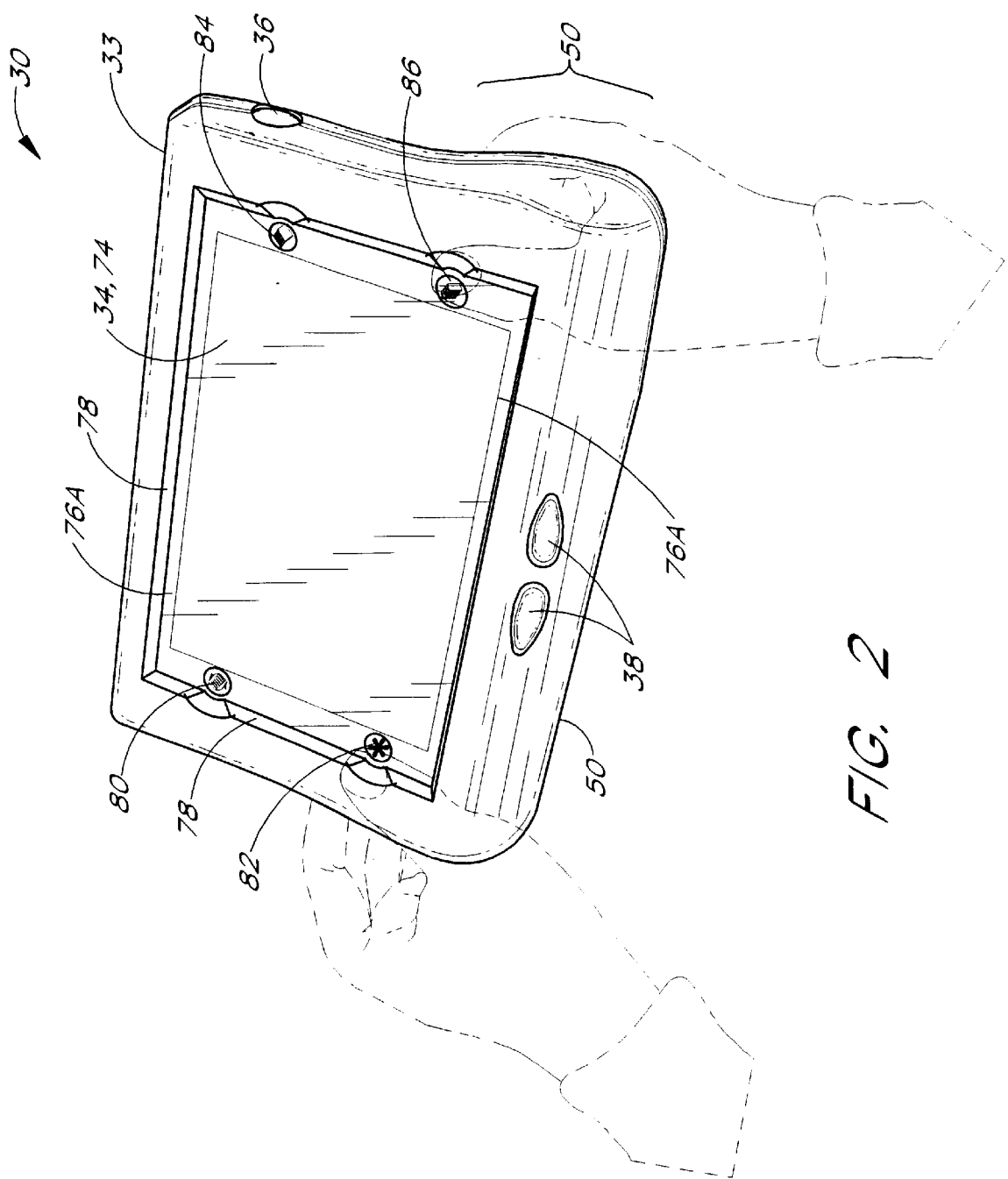

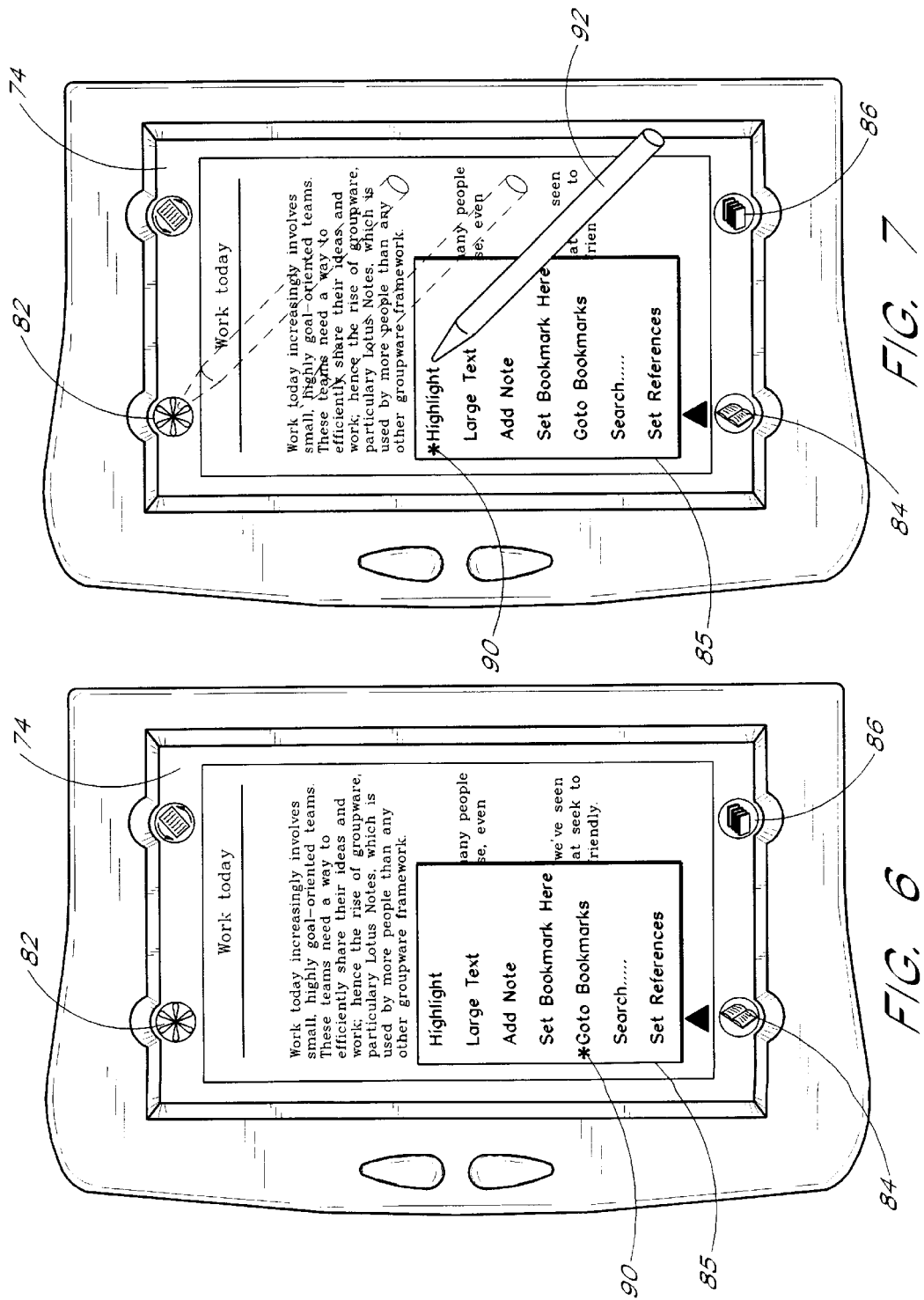

DISPLAY ORIENTATION FEATURES FOR HAND-HELD CONTENT DISPLAY DEVICE

RELATED APPLICATIONS

This application claims the benefit of provisional patent application Ser. No. 60/078,782, filed Mar. 20, 1998 pending.

FIELD OF THE INVENTION

The present invention relates to hand-held computing devices. More particularly, the present invention relates to user interface and other software features for facilitating the viewing and management of informational content using a touch-sensitive display.

BACKGROUND OF THE INVENTION

U.S. patent application Ser. No. 09/034,720, filed Mar. 4, 1998, discloses a secure content distribution system which enables users to securely download literary titles and other types of content to a hand-held reader device. Using the reader device's control buttons and touch-sensitive display, users can perform such tasks as selecting, viewing and deleting titles, adjusting the font size and orientation of displayed text, and adding notes to selected passages. Because the titles are disseminated and stored in digital form, many of the costs associated with the sale and distribution of books and other types of printed publications are eliminated, including the costs associated with printing, storing and shipping of such publications.

In order for such a system to appeal to the mass public, it is important that the reader device have a user interface which is simple and intuitive to use. In addition, the device should provide functions which take advantage of the content's digital form, so that users have the incentive to use the system in place of printed publications. Further, the device should be comfortable to hold during prolonged viewing session.

The present invention addresses these and other problems.

SUMMARY

The present invention comprises a hand-held computing device that is adapted to be used as a reading device for the reading of literary titles and other types of content. The device includes a touch-sensitive display and a graphical user interface that provide various functions associated with the viewing of titles stored in the device's memory. In a preferred embodiment, the device is adapted to communicate with a PC or other general purpose computer via a cradle.

In accordance with one aspect of the invention, the device implements an automatic look-up feature which can be invoked by the user to look up a word of a displayed title. Using this feature, the user can, for example, bring up a definition, language-to-language translation, audible pronunciation, encyclopedia listing, picture, or other type reference listing associated with the displayed term. In one embodiment, the user looks up the word by tapping the word twice—once to select the word and a second time to initiate the look-up process. The device responds by searching for the word in a pre-specified or default reference title (dictionary, encyclopedia, etc.) and displaying the results on the display. The reference titles can be downloaded to the device by the user, and can be designated for use with specific literary titles using the device's user interface.

In accordance with another aspect of the invention, the touch-sensitive display has a fixed icon displayed thereon which represents a user-definable function key or "hotkey." Using the hotkey, the user can execute a commonly-used menu or sub-menu item (function), such as a "Set Bookmark Here" function, with a single touch of the display. To assign a function to the hotkey, the user initially brings up one of the device's menus on the display, such as by touching a "book menu" or "library menu" key. The user then performs an intuitive drag-and-release operation from the hotkey to the target menu item, or vice versa. Thereafter (until a subsequent reassignment), the target menu item is executed immediately whenever the user touches and releases the hotkey with no menu displayed on the screen.

In accordance with another aspect of the invention, the device supports a citation routing feature which allows a user to select a passage on the touch-sensitive display and then designate a destination for the subsequent routing of the passage by the general purpose computer. In a preferred embodiment, the user initially highlights the passage on the display and then taps once on the passage to bring up a menu of routing options. From this menu, the user can select one or more routing addresses, including email addresses, fax numbers, file folders and printers. In addition, the user can type-in an optional annotation using a pop-up keyboard.

Once this process is complete, the device preferably creates a citation file which indicates the passage and destination(s) selected by the user. When a communications link is subsequently established between the device and the general purpose computer (such as by placing the device in the cradle), the citation file is automatically transferred to the computer (together with any other citation files that have been created but not yet transferred). A software application running on the general purpose computer in-turn routes the passage and optional annotation to the user-specified destination(s).

In accordance with another aspect of the invention, the device includes an orientation key which can be touched by the user to bring up four orientation markers on the screen, each of which corresponds respectively to one of the four possible display orientation settings (0, 90, 180 or 270 degrees relative to a base or gripping portion of the device). Each of the markers is preferably in the form of an arrow which points to one of the four edges of the display. To select a display orientation, the user simply touches the arrow that points to the desired top of the display. When the user places the device in the cradle, the device automatically resets the orientation to the base (zero degrees) setting to facilitate the viewing of content while the device is in the cradle.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

FIG. 2 is a perspective view of the hand-held reader device of FIG. 1.

FIG. 3 is a side view of the device, illustrating an expanded base portion that may be used to conveniently hold the device in one of four supported orientations.

FIGS. 6 and 7 illustrate, in example form, a hotkey assignment feature of the device's user interface.

DETAILED DESCRIPTION OF PREFERRED EMBODIMENTS

Figure 1:
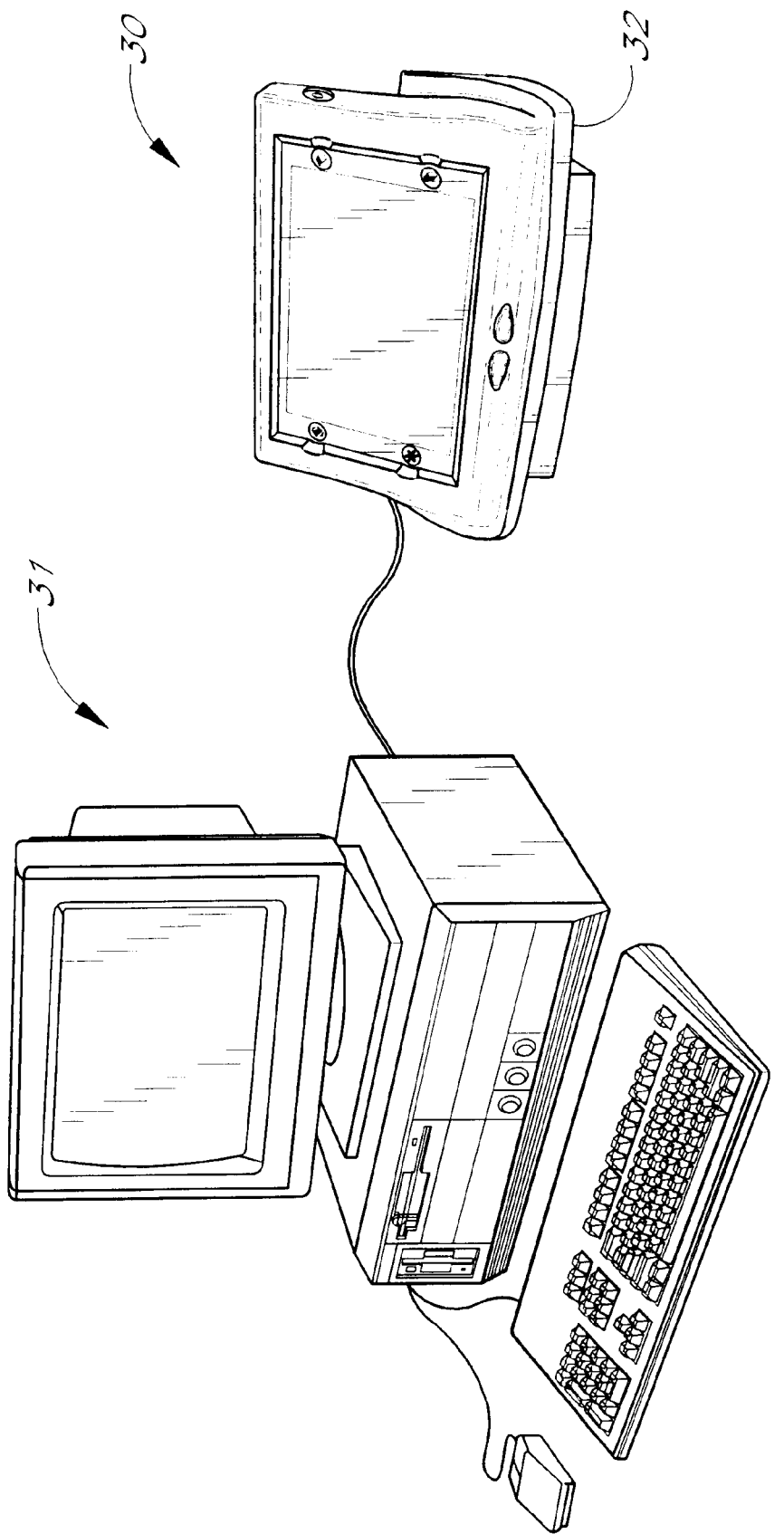
FIG. 1 illustrates the physical user components of a content distribution and display system in accordance with the present invention.

Throughout the following description, reference will be made to various implementation-specific details, including, for example, specific standards that are used in the computer industry. These details are provided in order to fully set forth a preferred embodiment of the invention, and not to limit the scope of the invention. The scope of the invention is set forth in the appended claims.

I. System Overview

FIGS. 1–5 illustrate a content distribution and display system which incorporates the various features of the invention. The system includes a hand-held computing device 30 that is adapted to be used as a portable reading device for allowing a user to read literary titles (books, journal articles, newspapers, memoranda, emails, etc.) and other types of content via a touch sensitive display 34. The titles are preferably downloaded to the device 30 in digital form from a Personal Computer (PC) 31 (FIG. 1) using a docking station or "cradle" 32. Using the device's user interface (described below), a user of the device can perform such tasks as selecting titles to view, adjusting the font size and orientation of the displayed text, deleting titles from memory, and attaching notes and bookmarks to the displayed text.

In accordance with the invention, various software features are provided for facilitating the management and display of content using the device's touch sensitive display 34. Prior to describing these features, an overview will be provided of the general construction and operation of the hand-held device 30 and related components. As will be apparent from the following disclosure, the features of the invention may be incorporated into other types of hand-held computing devices that have touch-sensitive displays.

As illustrated by FIG. 2, the reader device 30 includes a housing 33 which has respective openings for a touch-sensitive display 34, an ON/OFF button 36, and UP and DOWN scroll buttons 38. The back of the housing (not shown) has an opening formed therein for holding a stylus, and includes a multi-pin connector 40 (FIG. 5) for connection to the cradle 32. The device 30 also includes an audio speaker 44 (FIG. 5) for outputting digital audio signals, and includes an infrared (IrDA) transceiver 46 (FIG. 5) for communicating with kiosks, PC's, other infrared devices, or another hand-held device.

As illustrated by FIGS. 2 and 3, the housing 33 has an increased width and depth and a rounded configuration along its base to form an extended gripping area 50 for holding the device. The gripping area 50 is sized to correspond generally to a typical user's hand, and includes a curved portion which extends along the back side of the device to accommodate the user's fingers. As described below, the gripping portion is adapted to be used to hold the device in multiple different device orientations.

The gripping portion 50 houses one or more elongated, rechargeable batteries 51 (FIG. 5) that are used to power the device 30, and is thus heavily weighted in comparison to the remaining portions of the device. An important advantage of this device configuration and weight distribution is that it reduces stress on the user's hands and wrists during prolonged reading sessions. This feature, combined with the ability to change this display orientation (discussed below), facilitates the ability for the user to find a comfortable reading position.

Figure 4:
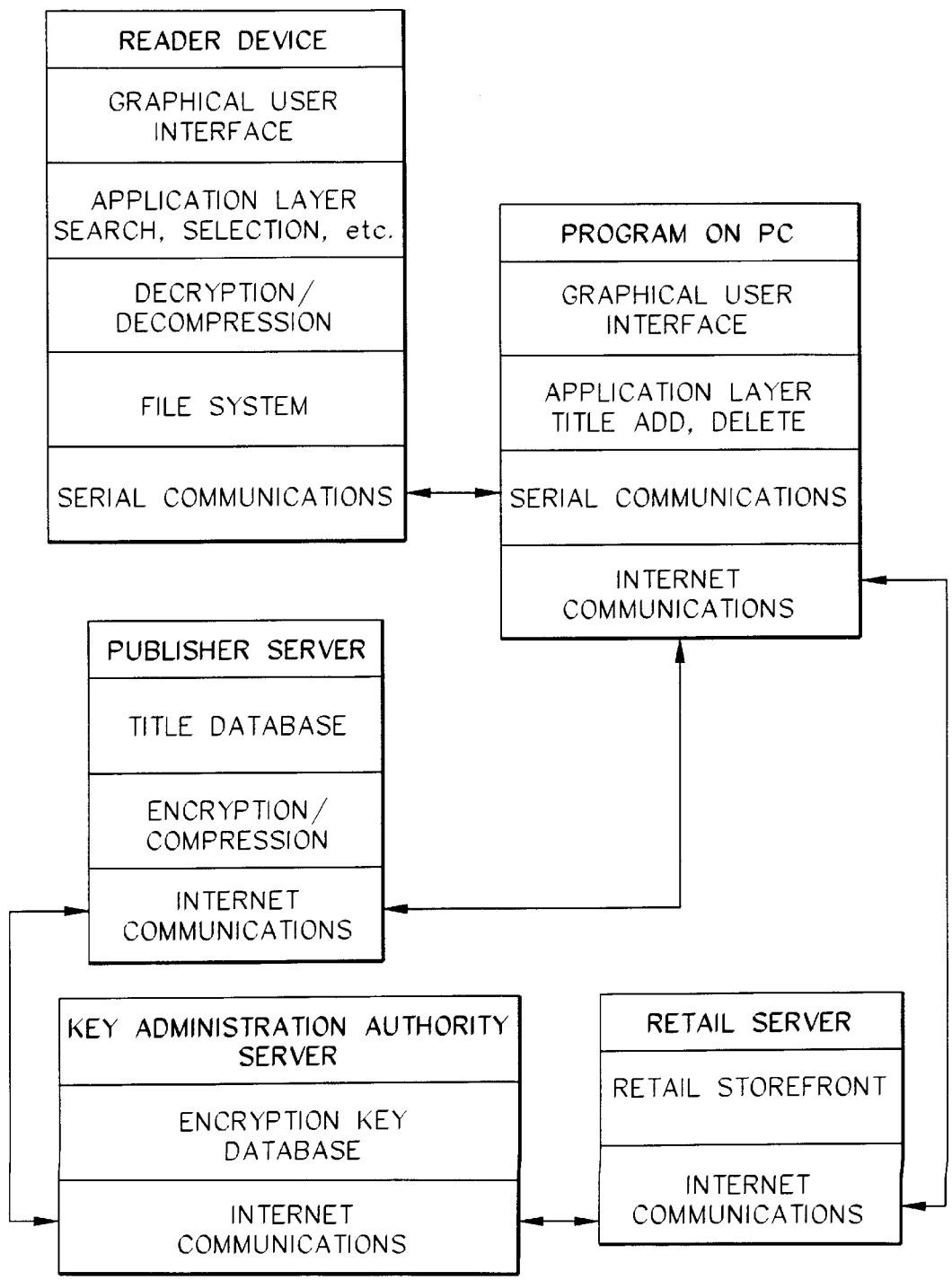
FIG. 4 illustrates the general software architecture of the system, including components that may be used to securely distribute literary titles to users.

As depicted by FIGS. 1 and 4, the reader device 30 is adapted to be used as part of a secure content distribution system which includes the PC 31, the cradle 32, and various software components. The cradle 32 plugs into the serial port (not shown) of the PC, and also plugs into a standard power outlet. Included within the content distribution system are one or more client applications which run on the PC 31. Using these applications, the user can purchase and download literary titles (novels, textbooks, journal articles, etc.) from Internet and other network sites to the PC, and subsequently transfer these titles to the device 30 for viewing. The device 30 may additionally or alternatively be provided with browser software and a modem for allowing the user to download titles to the device directly. Titles may additionally or alternatively be retrieved by the PC from a physical storage medium, such as CD-ROM or a DVD disk.

One type of PC application, which may be in the form of a browser plug-in, provides functionally for allowing a user to interactively purchase and download titles from Web sites. The PC 31 may also run a client application which retrieves free and/or subscription titles automatically (such as by implementing a "push" protocol) from network sites based on pre-specified preferences or subscription profiles of the user.

Regardless of the type of title retrieval method used, the titles that are stored on the PC 31 are preferably automatically transferred to the device 30 when the device is placed in the cradle 52. The software running on the PC may additionally or alternatively be configured to allow the user to initiate title transfers manually. The cradle 52 also acts as a charging station for automatically charging the device's batteries.

In one implementation, the device's software supports both the US ASCII and the Unicode character encoding standards. The use of Unicode allows the device to be used to display titles of multiple different written languages. The device is also capable of displaying graphics images, and playing sound clips, that are embedded within the titles. The system software also supports standard markup languages such as HTML (HyperText Markup Language), and supports the use of hyperlinks to navigate within and between titles.

In one embodiment, the device includes a speech synthesizer application which converts encoded text (ASCII, Unicode, etc.) into audible speech. Using this application, a user can listen to a selected title. The speech synthesizer application is preferably configured to automatically scroll and highlight the text on the display 34 in synchronism with the audible output, so that the user can optionally "follow along" with the synthesized speech. This feature may be used, for example, to assist the user in learning a new language or to assist the vision-impaired.

Titles may optionally be downloaded from Internet sites and transferred to the device 30 in an encrypted form, in which case the encrypted titles are decrypted by the device "on-the-fly" as the titles are viewed. Preferably, the titles are encrypted (typically by server software running on a Web site) using a public key that corresponds uniquely to a particular device 30 or the user, and are decrypted using a private key which is stored within the device. When the user purchases an encrypted title, the user identifies the device to the network site using a unique identifier, and does not need to know (and does not have access to) the private key. This distribution method protects the content from being accessed by unauthorized users.

In one embodiment, two sets of public/private key combinations or "certificates" are used. The first certificate is assigned in the factory during the manufacturing process and is called the "Device Certificate." The Device Certificate corresponds to a particular device 30 and allows a key administration entity to have a protected conversation with the device. The second certificate is assigned and downloaded to the device during the user registration process and is called the "User Certificate." The User Certificate follows the particular user (i.e., can be transferred from one device to another), and is used to encrypt and decrypt titles. This approach allows the user to upgrade and/or replace the physical device 30 without losing access to existing titles that have been encrypted for the user.

FIG. 4 illustrates the general software architecture of the reader device and associated PC software, and also illustrates the general server architecture of a secure content distribution system. Additional details of the secure content distribution system are provided in U.S. application Ser. No. 09/034,720, filed Mar. 4, 1998, the disclosure of which is hereby incorporated by reference in its entirety.

Figure 5:
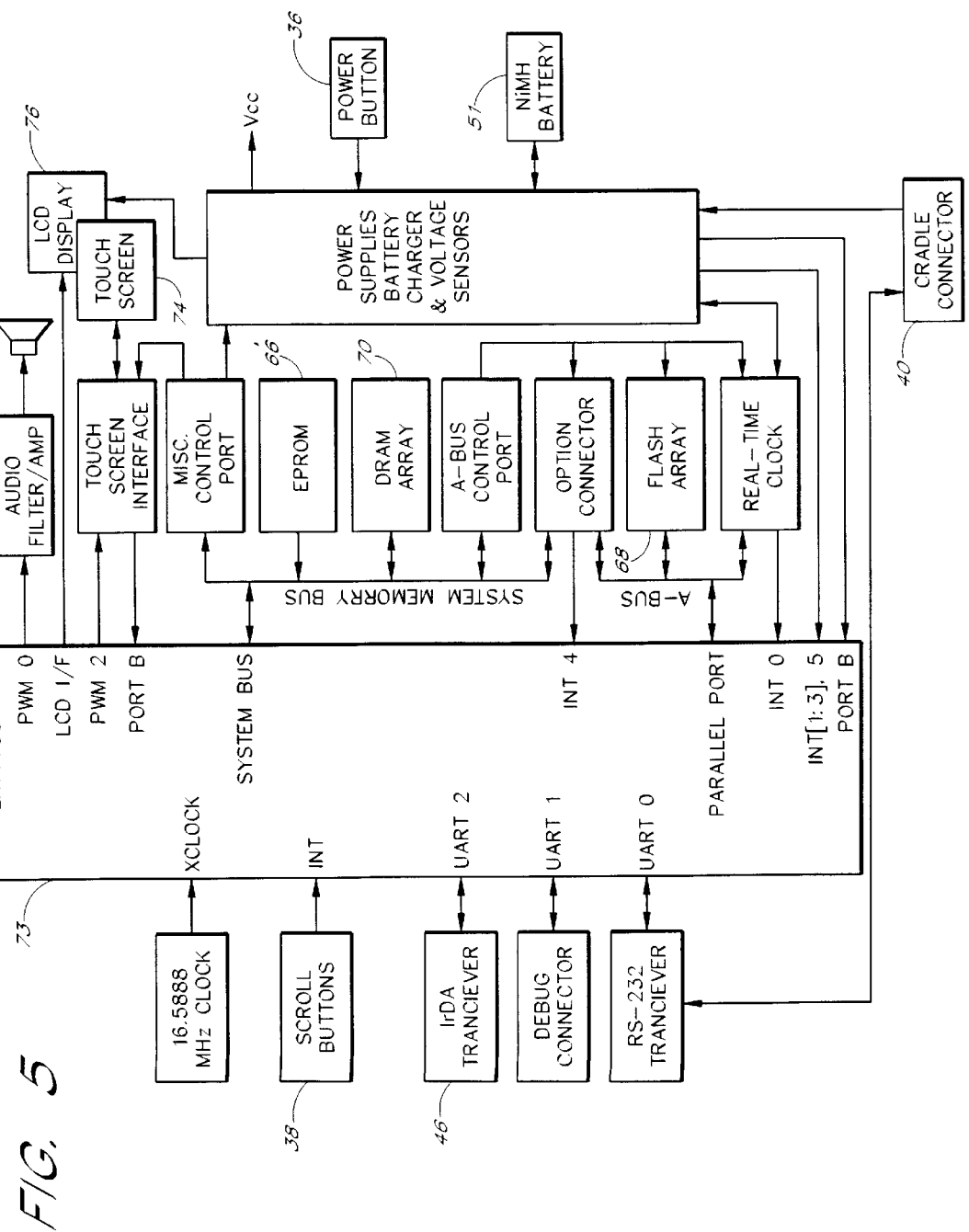
FIG. 5 illustrates the general hardware architecture of the device.

As depicted by FIG. 5, the device 30 is controlled by a Sharp LH77790 microprocessor 73 which accesses three types of memory: an EPROM 66, a FLASH array 68, and a DRAM array 70. The EPROM 60 is used primarily to store system software used during initial boot-up, along with certain security keys. The FLASH array 68 is used primarily to store system software, the user and device keys, titles and software applications. Titles that are downloaded to the device in encrypted and/or compressed form are maintained in such form in FLASH memory, and are written to DRAM as they are decrypted and decompressed for viewing. Other details of the hardware architecture are set forth in the above-referenced application.

The device 30 preferably operates under the control of a proprietary operating system developed by NuvoMedia Inc., but may alternatively operate, for example, under the control of the Windows CE™ operating system from Microsoft Corporation. The PC applications run under the Microsoft Windows™ family of operating systems, but may be adapted to run on Mac OS, Unix, and other platforms.

With reference to FIGS. 2 and 5, the device's touch-sensitive display 34 includes a touch screen 74 which is mounted on top of an LCD display 76 (the perimeter of which is denoted by 76A in FIG. 2). The LCD display 76 is equipped with a backlight (not shown) which can be turned ON and OFF using the power button 36. The touch screen 74 extends to or slightly beyond the inward-facing edge 78 of the device's bezel. In one implementation, the touch screen 74 is a Panasonic EMU-601A2N400 device.

II. Overview of User Interface

As illustrated by FIG. 2, the portion of the touch screen 74 which extends beyond the perimeter 76A of the LCD display 76 has four fixed icons displayed thereon to form four respective function keys: an orientation key 80, a user-definable "hotkey" 82, a book menu key 84, and a library menu key 86. Each icon is in the form of an orientation-independent image that conveys meaning regardless of the orientation in which the device is being held. For example, in any of the four possible device the orientations, the orientation icon 80 appears as a page of text that is being rotated.

When the orientation key 80 is touched, the device displays four arrows (FIG. 27), each of which can be touched to select one of four possible display orientations (0, 90, 180 or 270 degrees relative to the base 50 of the device). Using this feature, the user can select a text orientation which corresponds to the user's preferred device orientation and gripping method. For example, a left-handed user may choose the device/text orientation in which the gripping area 50 falls on the left-hand side of the device (as in FIG. 6), and a right-handed user may choose the opposite orientation. The combination of the weight-concentrated gripping area 50 and the ability to change the display orientation allows the device to be used in multiple different orientations without sacrificing comfort. The screen orientation features of the device are discussed further below.

When the user touches the hotkey 82, the device 30 performs a function (the "hotkey function") that is currently assigned to the hotkey 82. As described separately below with reference to FIGS. 6–8, one aspect of the invention is a user interface feature which allows a user to rapidly and intuitively designate the hotkey function.

When the user presses the book menu key 84 or the library menu key 86, the device 30 displays a book menu 85 (FIG. 6) or a library menu (not shown), respectively. The book menu 85 includes various menu items which pertain generally to the title that is currently being viewed. The library menu contains menu items which pertain generally to the library of literary titles that are currently stored within the device 30. The menu and sub-menu items of the book and library menus are listed and summarized in Table 1.

TABLE 1

| Menu Item | Description |
| --- | --- |
| Book Menu/ Highlight | Toggles mode which allows user to touch words, lines and paragraphs to permanently highlight them. |
| Book Menu/ Large Text | Toggles page display between normal and large fonts. |
| Book Menu/ Add Note | Causes a user note to be attached to the selected text, or if no text is selected, to the current page. |
| Book Menu/Set Bookmark Here | Sets a bookmark to the selected text, or if no text is selected, to the current page. The first few words of the selection are used as the default identifier of the bookmark. |

TABLE 1-continued

| Menu Item | Description |
|---|---|
| Book Menu/Goto Bookmarks | Displays a list of the bookmarks for the title, including both bookmarks defined by the publisher (such as "index" and "table of contents") and bookmarks defined by the user. From this list, the user can either goto or delete a displayed bookmark. |
| Book Menu/Search | Displays a sub-menu of search options (see below). |
| Book Menu/Search/ Lookup | Searches the displayed title for a text string. The string can be selected before invoking this function, or can be entered using a pop-up keyboard. |
| Book Menu/Search/ "other tags" | Takes the user to the publisher-defined tags. These tags are incorporated into the Search menu automatically. |
| Book Menu/Set References | Allows the user to designate one or more reference titles to be used in place of a default reference title. |
| Library Menu/ Bookshelf | Displays of list of the titles currently stored on the device. From this list the user can delete titles or select a title for reading. |
| Library Menu/ Desk Supplies | Displays a list of additional programs available on the device. |
| Library Menu/Set Citation Destinations | Allows user to create lists of destinations (email addresses, fax numbers, etc.) for routing selected passages. The destination lists can alternatively be generated on the PC and transferred to the device. |
| Library Menu/ "title" | The library menu always displays the four most recently used literary titles. Touching a title will cause the title to be opened. |

III. Assignment of Hotkey Function

The hotkey function can be any of the menu items listed in Table 1. When the hotkey 82 is touched and released, the device 30 executes this function. The hotkey feature thus allows a user to quickly invoke a commonly used menu or sub-menu function with a single touch of the screen.

With reference to FIG. 6, the menu or sub-menu item that is currently defined as the hotkey function is denoted as such by a hotkey icon 90. In this example, the hotkey icon 90 appears next to the "Goto Bookmarks" item of the book menu. With this hotkey assignment, the device 30 will display a list of bookmarks when the hotkey 82 is touched. If the current hotkey function has a sub-menu associated with it, touching and releasing the hotkey 82 will cause this sub-menu to be displayed.

An important feature of the device is a user interface method for allowing the user to define the hotkey function using an intuitive drag-and-release technique. This method is illustrated in example form by FIGS. 6 and 7. With reference to FIG. 6, the user initially brings up the menu or sub-menu that contains the target hotkey function. As depicted by FIG. 7, the user then touches the hotkey 82 with the stylus 92 (or the user's finger), drags the stylus to the target item, and then removes the stylus from the touch screen 74.

During the dragging process, the hotkey icon 90 is displayed next to the menu item (if any) that is currently touched. In FIG. 7, for example, the hotkey icon 90 is displayed next to the "Highlight" item since the stylus 92 is currently over that item. This feature allows the user to readily identify the item that will be assigned as the hotkey function when the stylus 92 is lifted from the screen. The selected item may additionally or alternatively be displayed in a highlighted form. In addition, a shadowed, grayed, or other representation of the hotkey icon may follow the stylus tip during the dragging process.

If, during the dragging process, the stylus is moved away from the menu 85, the hotkey icon either (a) re-appears next to the currently-assigned hotkey function (if this function appears in the displayed menu), or (b) disappears from the display (if the currently-assigned hotkey function does not appear in the displayed menu). If the stylus 92 is not over a menu item when the stylus is withdrawn from the screen 74, the prior hotkey assignment remains in effect.

In other implementations, the device 30 may additionally or alternatively be configured to allow the user to assign the hotkey function by dragging and dropping the target menu item onto the hotkey 82. With this alternative method, the user touches the menu item, drags the item across the screen 74 to the hotkey 82 (during which a shadowed or dulled representation of the item preferably moves across the screen with the stylus), and then removes the stylus from the screen. The hotkey icon 90 is then displayed next to the menu item to indicate that the operation was successful. In addition, although the hotkey 82 in the preferred embodiment is a fixed icon on the touch screen 74, the above method can also be used to assign a function to an electronically-displayed hotkey.

Figure 8:
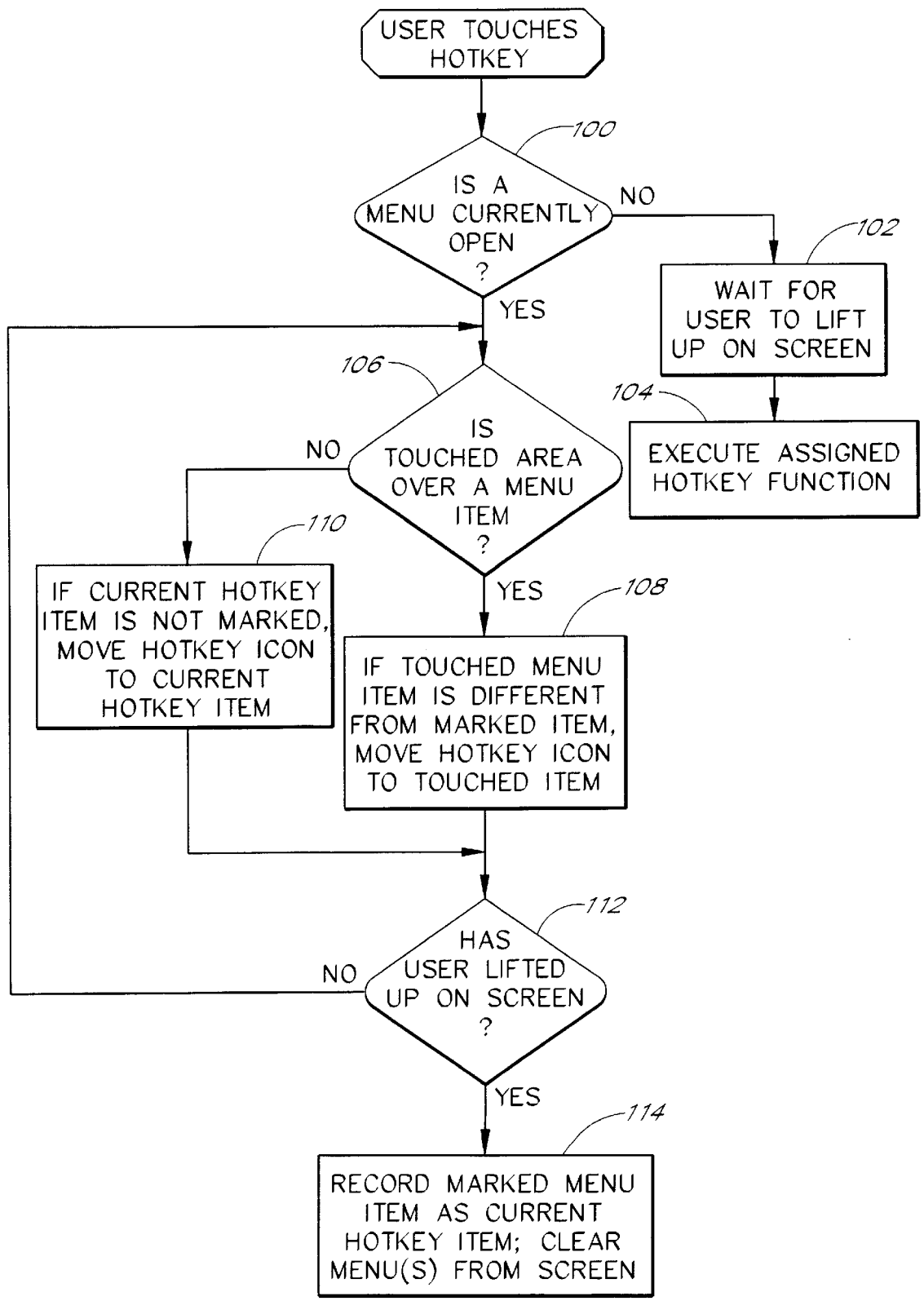
FIG. 8 illustrates a sequence of program steps that are performed by the device to implement the hotkey assignment feature.

FIG. 8 is a flow diagram of a software routine that is used to implement the FIG. 7 technique. This routine is invoked when the hotkey 82 is initially touched. As represented by steps 100–104, if no menu is open when the hotkey is touched, the program waits for the user to lift up from the screen and then executes the current hotkey function. If, on the other hand, one or more menus are currently open, the program enters into a hotkey assignment sequence (steps 106–114).

In step 106, the program determines whether the touched area is over a menu item. If it is, and the touched menu item is not currently marked with the hotkey icon, the hotkey icon is moved to the touched item (step 108). If it is not, and the current hotkey item is not marked, the hotkey icon is moved to the current hotkey item (step 110), which may or may not be displayed on the screen. As indicated by steps 112 and 114, this process is continued until the user lifts up on the screen, at which time the marked menu item is set as the current hotkey function.

As indicated above, the program may additionally or alternatively support dragging and dropping the menu item to the hotkey. In addition, in one embodiment, the hotkey function can be assigned by dragged the hotkey icon directly from one item to another item that appears in the same menu or sub-menu.

IV. Reference Titles

Figure 10:
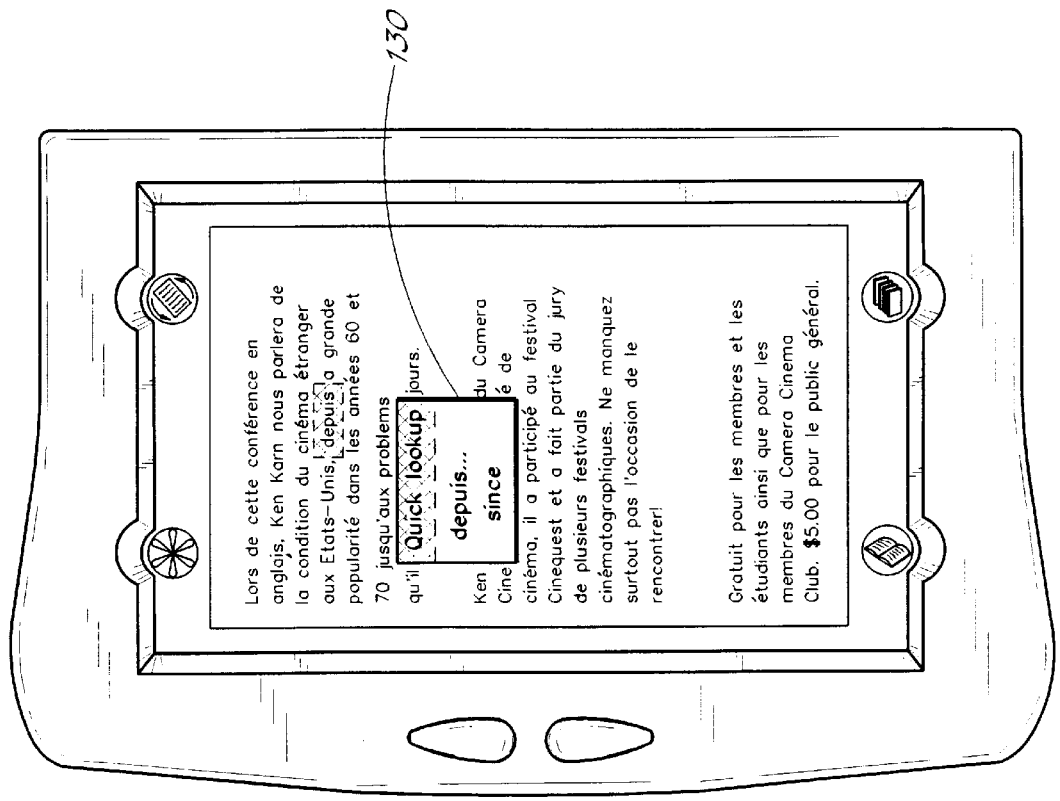
FIGS. 9 and 10 illustrate, in example form, a reference titles feature that enables users to look up selected terms within a pre-specified or default reference title.
Figure 11:
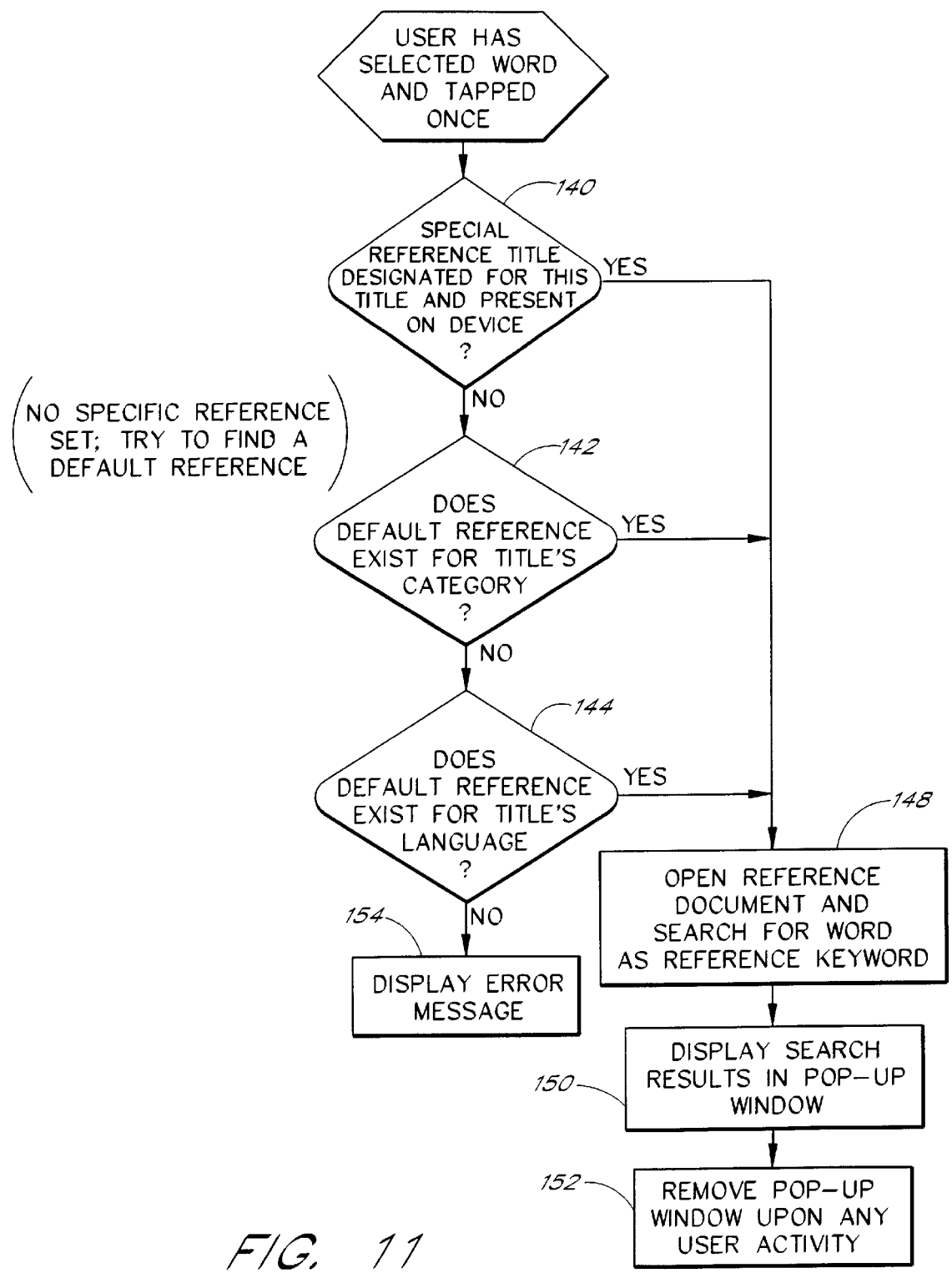
FIG. 11 illustrates a sequence of program steps that are performed to implement the reference titles feature.

Another important feature involves the ability of the user to look up a word or phrase using a default or pre-specified reference title. This feature of the device is illustrated in FIGS. 9, 10 and 11, which demonstrate the use of the feature to look up a translation of a selected term.

Figure 9:
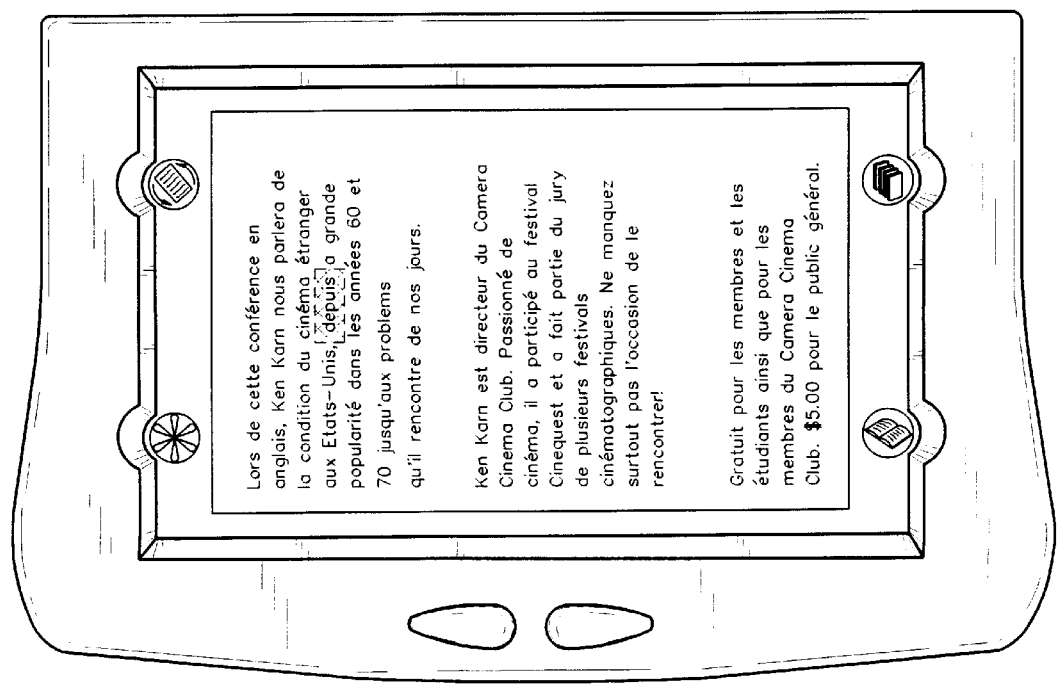

As depicted by FIG. 9, the user initially selects the term by tapping it once. If the user then taps the selected term a second time, a sequence of steps is initiated in which the device attempts to locate an appropriate reference title, and if one is found, searches for the selected term. If a reference title is located, a pop-up window 130 (FIG. 10) is used to display the results of the search. If no reference title is found, a pop-up window appears which displays an error message, such as a message which gives the user the option of designating a reference title for the title being viewed.

In addition to including textual results, a reference title may include graphical images that are displayed in the pop-up window 130, and/or audio search results that are played back on the speaker. For example, a dictionary reference title may include audible pronunciations that are played back concurrently with the display of the definition, or that are played back if the user taps the look-up term within the pop-up window 130. In other embodiments, the device 30 may be capable of playing back video and multimedia clips that are stored within the reference titles. To enable the search software to discriminate between the look-up terms and the associated content (definitions, audio, etc.), the look-up terms are tagged within the reference title document as keywords.

As with literary titles, reference titles ("references") can be retrieved using the PC and downloaded to the device 30, and many different references can reside on the device concurrently. Examples of the different types of references that can be used include linguistic dictionaries, language-to-language dictionaries, dictionaries specific to a given technical field (e.g., medicine), encyclopedias, and thesauruses. Using appropriate software which runs on the PC, the user may also be provided the option of creating a "custom" reference to be downloaded to the device 30.

The reference for a given literary title can be designated by the user using the "Set References" menu item (Table 1) of the book menu. If no reference has been designated for the title when the look-up is initiated, the device 30 attempts to locate a default reference using various classification tags that are embedded within the literary and reference titles. These tags may include, for example, a language tag which indicates the title's primary language, and a category tag which indicates any special category or categories that the title falls within (e.g., medicine, physics, electronics, law, etc.).

In the preferred embodiment, the reference titles and the literary titles are downloaded are stored separately from one another. In other implementations, the two types of titles can alternatively be combined within a single title. For example, a publisher could sell an electronics textbook which has one or more corresponding reference titles embedded therein.

In one embodiment, the user can designate primary and secondary references for a given title. The device 30 will then search the secondary reference (or references) only if no match is found in the primary reference. The device may also be configured to jump directly to the secondary reference (rather than initially searching the primary reference) when the user preforms a specific action, such as tapping on the term three times in rapid succession. Using this feature, a user could, for example, set up the device such that tapping on the word twice brings up a dictionary definition while tapping on the term three times brings up a translation or audible pronunciation.

FIG. 11 illustrates one embodiment of a software routine which can be used to implement the look-up feature depicted in FIGS. 9 and 10. The routine is invoked when the user taps twice on a word of a literary title (once to select the word, and a second time to initiate the search). As represented by step 140, the program initially determines whether a special reference has been designated for the title, and if so, whether the reference is present in memory. A special reference may be designated either by the publisher or by the user, and may be specified within the literary title using a special tag.

If no special reference is located, the program begins to search for an appropriate default reference. In this example, the program first checks the titles's category tag (if any) and searches for a reference that corresponds to the title's category (step 142). If multiple matching references are found, the user may be prompted to designate one of the references as a default for that category. If no category-based reference can be found, the program checks the language tag (if any) of the title and searches for a corresponding language-based reference (step 144). If multiple language-based references are found, the user may be prompted to select a default reference to be used for that language.

As depicted by steps 148–152, once a reference has been found, the program opens the reference and searches for the selected term as a reference keyword. As part of this step, the program initially determines whether the reference is marked as being ordered alphabetically, and if so, performs the search as a binary keyword search or other such search technique. The results of the search (definition, "not found" message, etc.) are displayed in the pop-up window 130, which is cleared upon subsequent user activity.

As depicted by step 154, an appropriate error message is displayed if no reference is found.

V. Selection and Routing of Content

Another important feature of the reader device 30 that it allows the user to define a "citation" which includes one or more passages from a displayed title, and then specify one or more destinations addresses (email addresses, fax numbers, printers, etc.) for routing the citation. When the user subsequently establishes a communications link between the PC and the reader device 30 (such as by placing the device in the cradle 32), any citations that have been defined by the user are automatically uploaded to the PC, and a utility running on the PC automatically routes the citations to the specified destinations.

Figure 13:
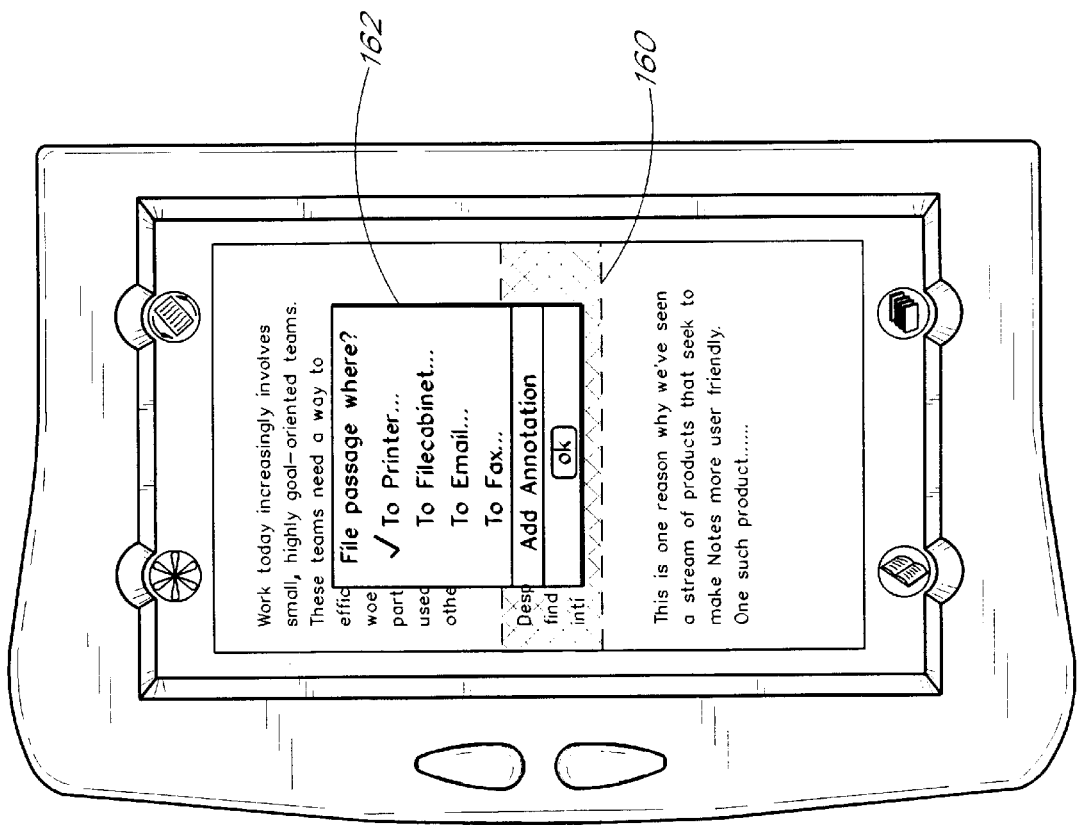
FIGS. 12 and 13 illustrate, in example form, a citations feature that can be used to route a selected passage to one or more destinations.
Figure 12:
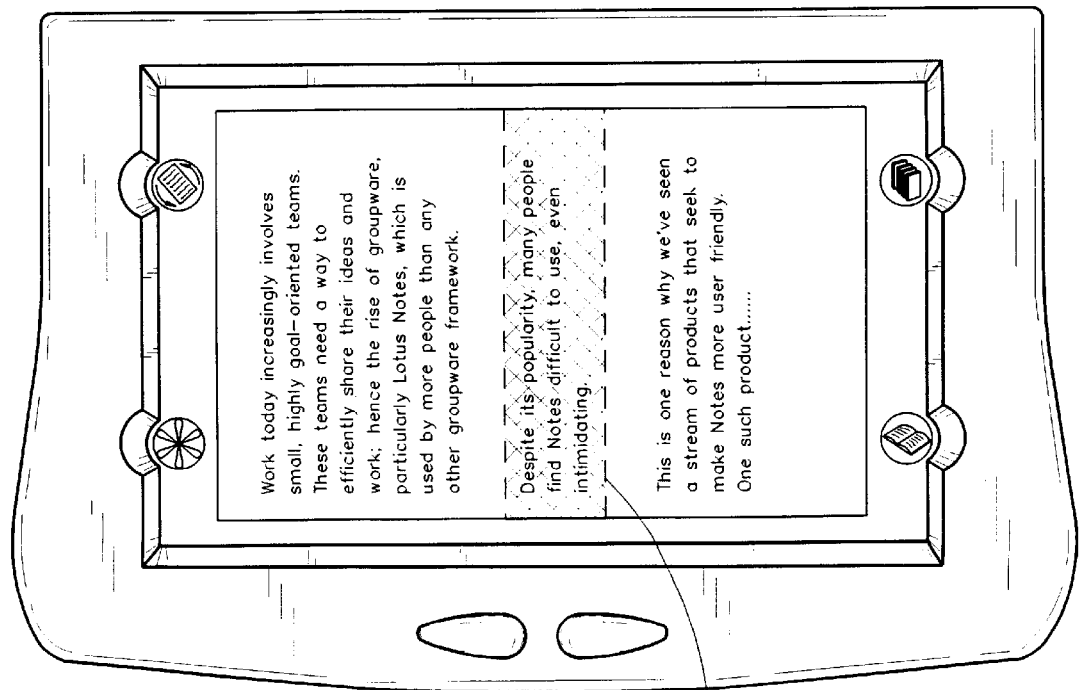

This feature of the invention is illustrated in example form by FIGS. 12 and 13. As illustrated by FIG. 12, the user initially uses the stylus to block a segment 160 of content, which in the FIG. 12 example consists of one paragraph of text. In a preferred embodiment, the device supports several different methods for blocking text, any of which can be used for this purpose. For example, through appropriate menus, the user can configure the device such that tapping anywhere on a paragraph causes the entire paragraph to be selected, or such that tapping on a sentence causes the sentence to be selected. The user can alternatively use a touch-and-drag method to select the passage.

With reference to FIG. 13, the user can then tap once on the selected passage 160 to bring up a dialog box 162. If the user then selects the "Add Annotation" item, a pop-up keyboard (not shown) and editing screen are displayed for allowing the user to type in an annotation. The user may also be presented with the option of adding additional passages to the citation.

As illustrated in FIG. 13, the dialog box 162 includes a list of the categories of destinations that can be selected for routing the citation. In the preferred embodiment, the user can route the citation to a printer, a file cabinet or folder object on the PC, an email address, a fax machine, or a combination thereof. When the user taps on one of these destination categories, the device either marks the destination category type as selected (if only one predefined destination exists for that category), or displays a list of the destinations that exist for that category (if multiple destinations have been defined). For example, the user can select the "To Email" category, and then select one or more email addresses from a personal address book.

Once all of the destinations have been specified and any annotation has been typed in, the user taps the OK button to complete the citation definition process. The device then uses the information specified by the user to build a citation file to be transferred to the PC. The citation file is preferably created such that the original formatting (font size, appearance, etc.) of the text is preserved.

Figure 14:
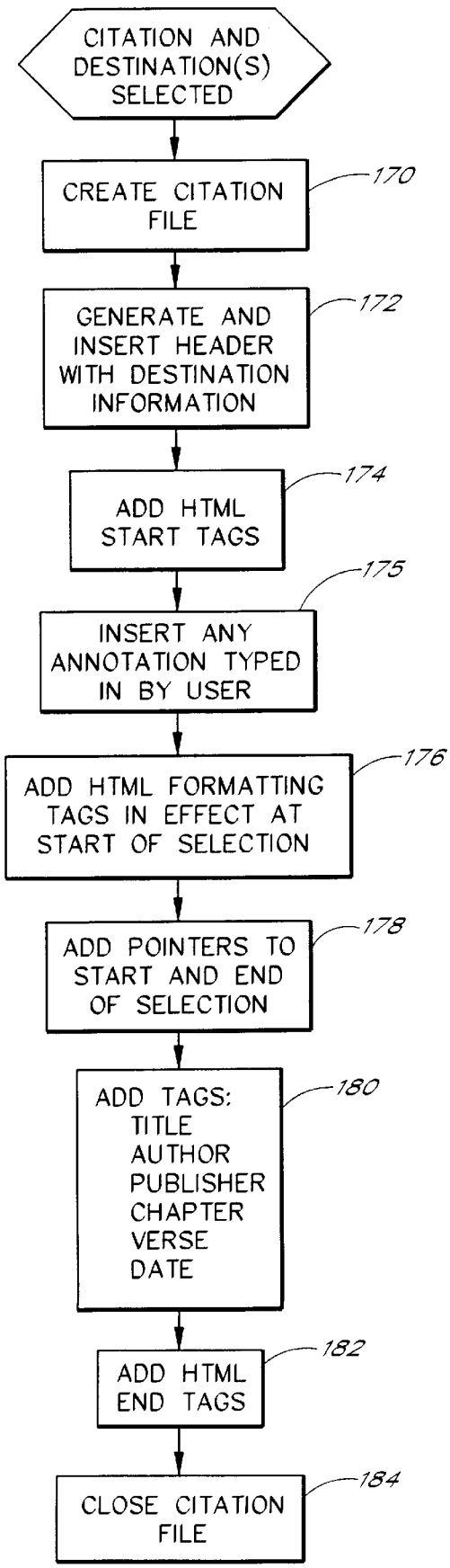
FIG. 14 illustrates a sequence of program steps that are performed by the device to build a citation file.

FIG. 14 illustrates a program sequence that may be used to generate an HTML citation file. It will be appreciated that other markup languages and/or file formats could alternatively be used. As depicted by FIG. 14, the program creates the citation file (step 170) and then inserts into the file the following elements: a header with the user-specified destination information (step 172), HTML start and end tags (steps 174 and 182), any annotation typed in by the user (step 175), any HTML formatting tags in effect at the start of the passage (step 176), pointers to the start and end of the passage (step 178), and applicable tags specifying the title, author, publisher, and date of the title and the chapter and verse of the passage (step 180). The file is then closed (184), and is thereafter maintained in memory until it is either successfully transferred to the PC or deleted by the user.

Step 176 (inserting HTML formatting tags in effect) involves searching the text which precedes the passage to identify any formatting tags that apply to the passage. The purpose of this step is to preserve the passage's formatting. For example, if the passage consists of the second sentence of a paragraph which is in bold and italics, this step will result in bold and italics tags being added to the file (just before the passage) so that these formatting attributes are preserved.

Step 178 (adding pointers) is performed in lieu of copying the passage over to the file. The purpose of this step is to conserve memory. When the citation file is later transferred to the PC, the pointers are replaced with the actual content of the passage. One potential problem with this approach is that the user may delete the title before the citation file is transferred to the PC. One method for avoiding this problem is to block the file from being deleted until the citation file has been transferred. Another method is to automatically copy the passage over to the citation file when the title is selected for deletion.

Figure 15:
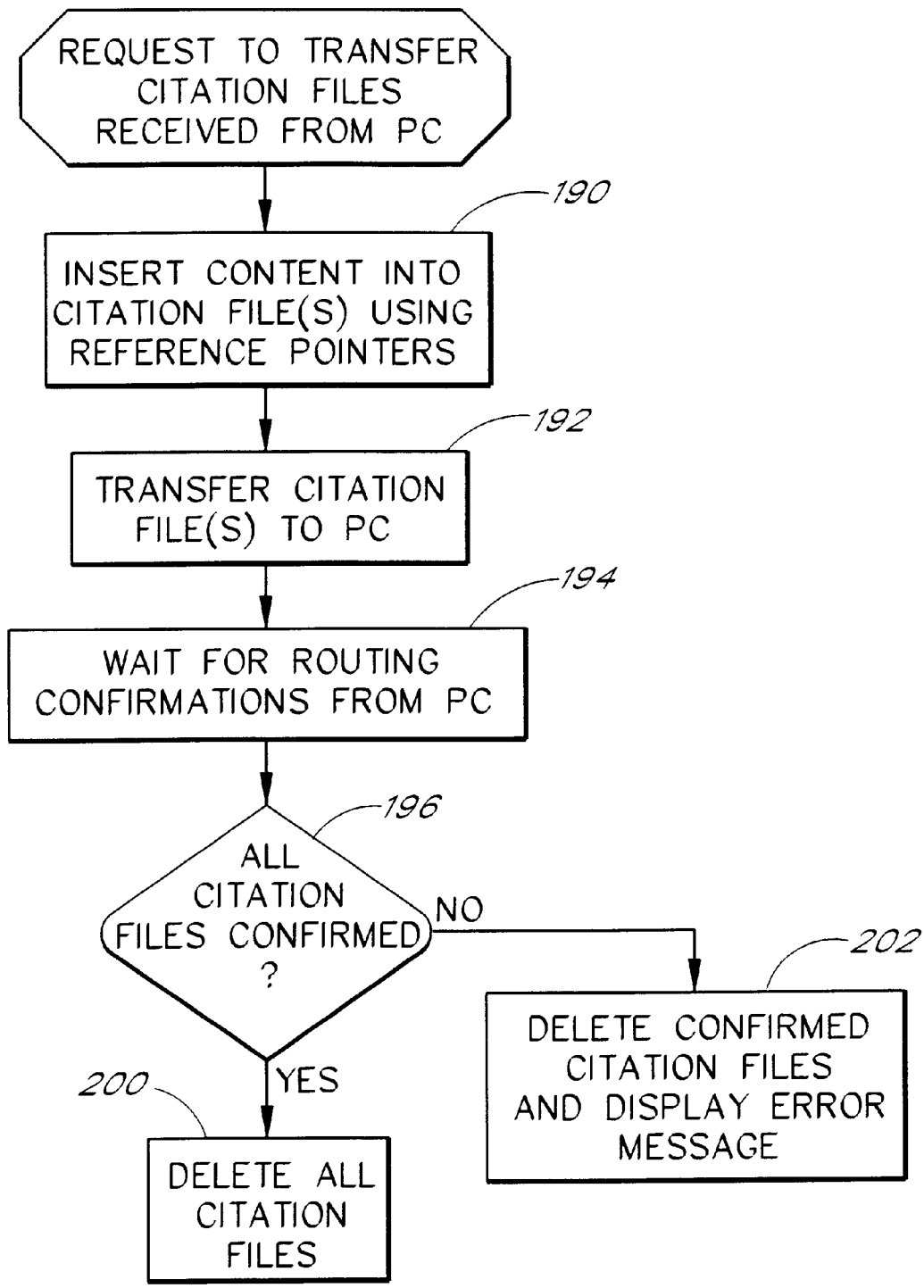
FIG. 15 illustrates a sequence of program steps that are performed by the device to transfer the citation files to the PC.

When the user places the reader device 30 in the cradle 32, or otherwise establishes a communications link between the device and the PC (such as via the infrared port or a modem), the PC sends a request to the device (assuming the associated PC application is running) for any new citation files that have been created. As depicted by FIG. 15, the device responds to the request (assuming one or more citation files have been created) by inserting the referenced passages into the citation files (step 190), transferring the citation titles to the PC (step 192), and waiting (for a timeout period) for routing confirmations from the PC (step 194). As depicted by steps 196–202, the device then deletes any files that are confirmed, and displays an error message if less than all of the citation files are confirmed.

Figure 16:
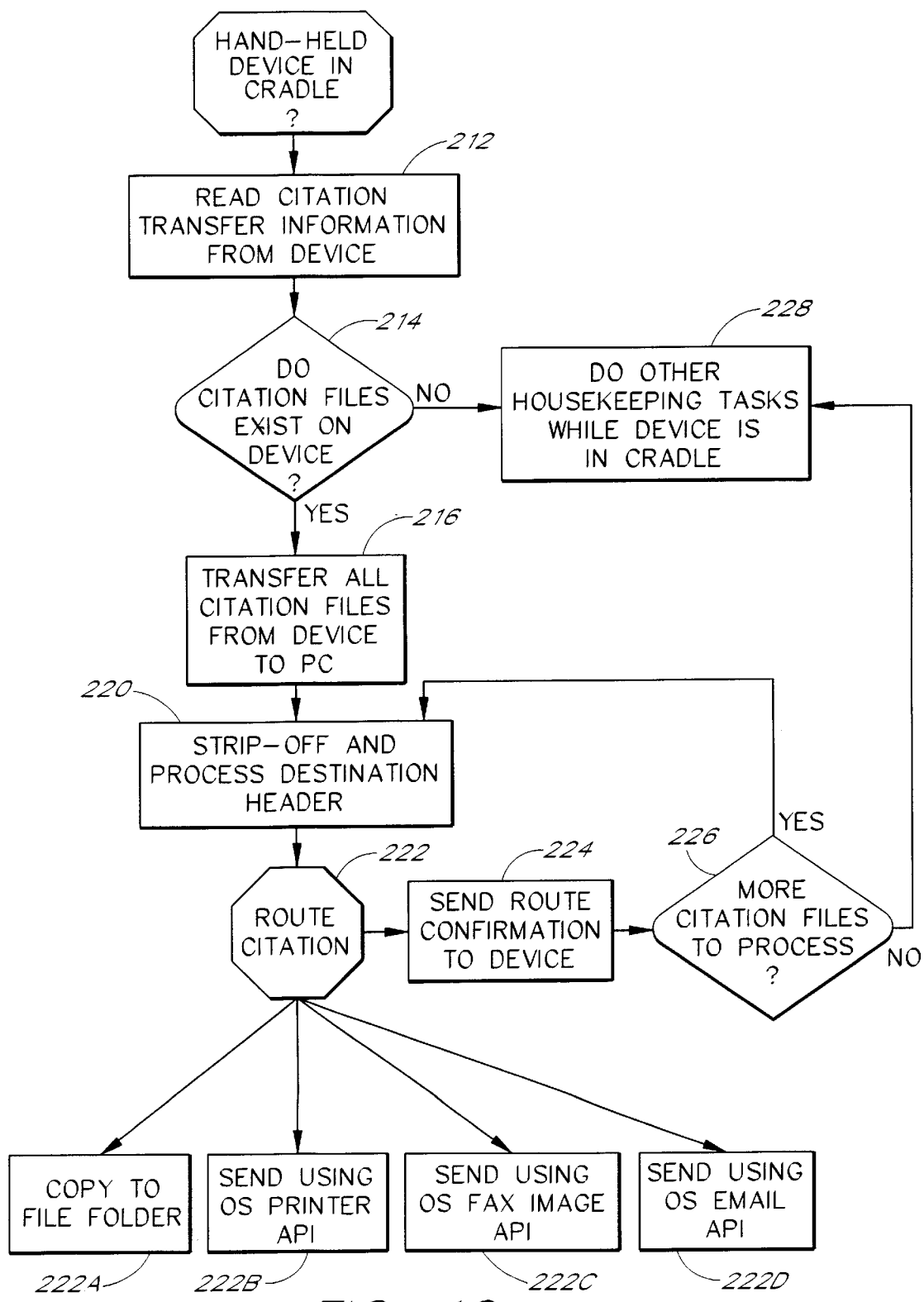
FIG. 16 illustrates a sequence of program steps that are performed by the PC to retrieve, process and route the citation files.

FIG. 16 illustrates a program that is executed on the PC when the reader device 30 is initially detected within the cradle, with emphasis on the steps that are performed to retrieve and route the citation files. As represented by steps 212 and 214, the program initially queries the device to determine whether any new citation files have been created. If no citation files exist, the program immediately performs other housekeeping tasks (step 228), such as downloading any new titles to the device 30.

If one or more citation files exist, the program initiates a transfer of the citation files to the PC (step 216). For each citation file, the program strips off the header (step 220), routes the citation to the appropriate destination(s) (step 222), and returns a routing confirmation message to the device (step 224). As represented by steps 222A–D, citation files that are addressed to a folder are copied by the program to that folder; and citation files that are routed to a printer, fax number or email address are routed using the respective operating system (OS) API (application program interface) of the Windows™ or other operating system. Once all of the citation files have been routed, the program initiates the other housekeeping tasks (steps 226 and 228).

VI. Screen Orientation

The screen orientation features will now be described in further detail with reference to FIGS. 17–19.

Figure 17:
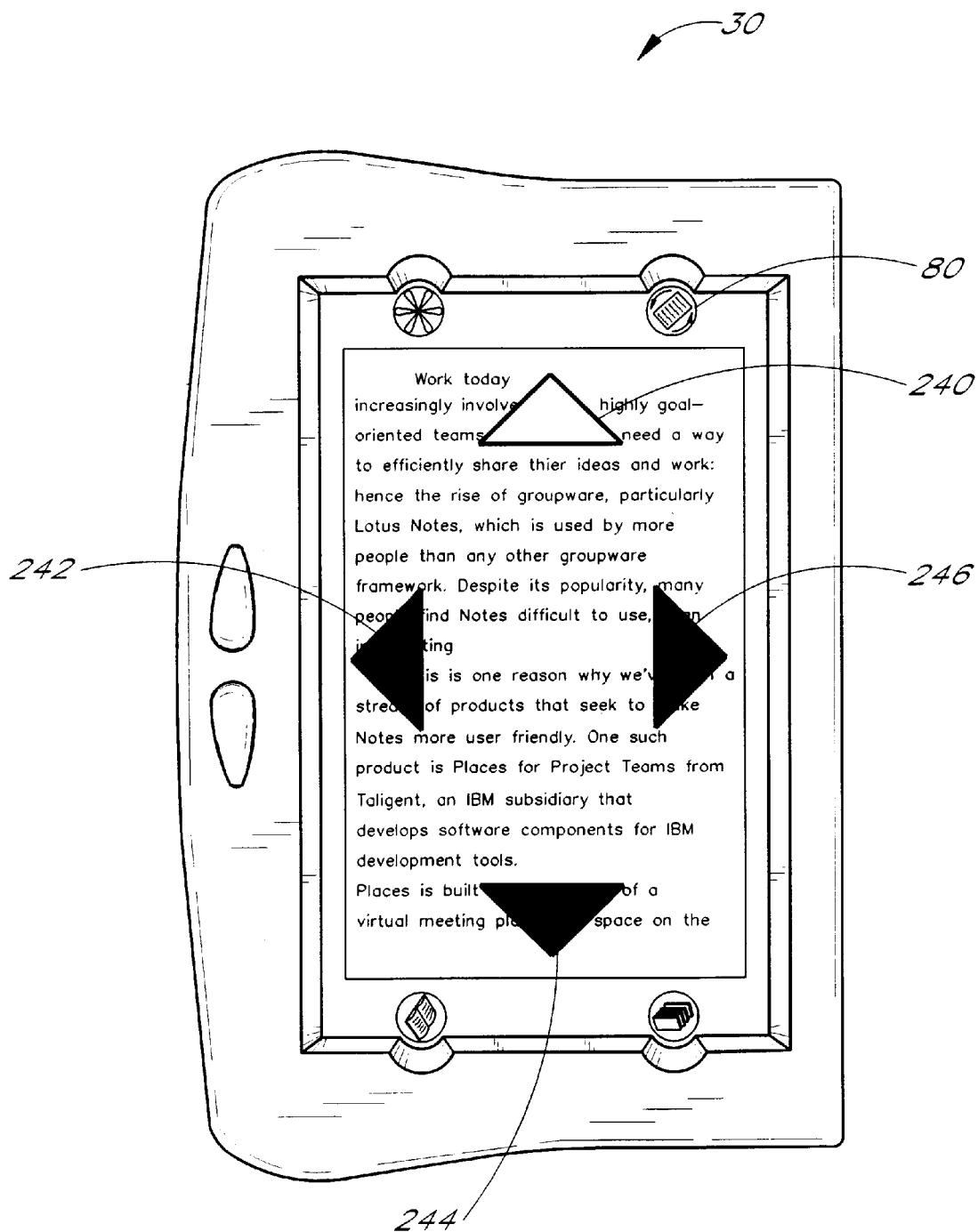
FIGS. 17 and 18 illustrate, in example form, a screen orientation feature of the device.
Figure 18:
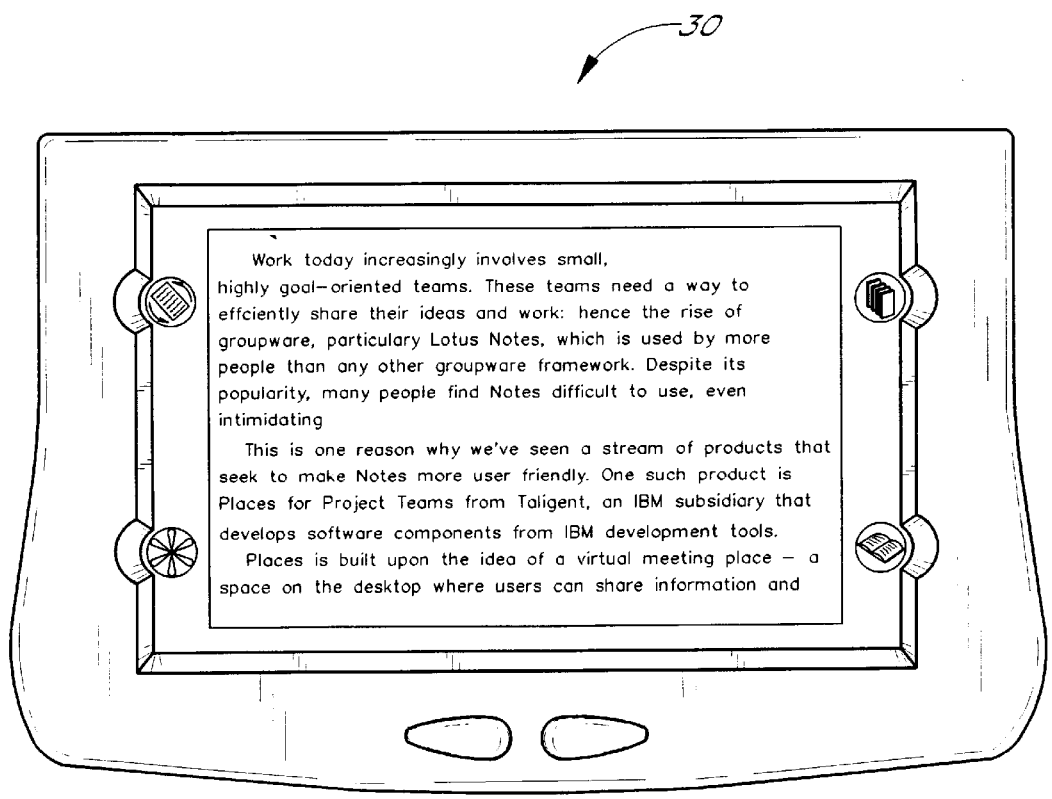

As illustrated by FIG. 17, pressing the orientation key 80 causes four graphical orientation markers 240–246 to be superimposed over the displayed text adjacent to respective edges of the display. The markers 240–246 are in the form of arrows which point to the four respective edges of the display, with each arrow representing one of the four possible display orientation settings. The marker that corresponds to the current setting (240 in this example) is shown in a highlighted form.

To select a new orientation setting, the user taps the marker that points to the desired to edge of the display. This causes the device to clear the markers and repaint the displayed text using the new orientation (if different from the current orientation). For example, if the user taps on arrow 246 in FIG. 17, the text will be redisplayed with the orientation shown in FIG. 18. This feature of the device allows the user to quickly (with only two taps) and intuitively select a display orientation that corresponds to the user's device orientation preference.

An important aspect of this method is that it does not involve the use of textual menu items or other orientation-specific controls. As a result, there is no impediment to placing the device in the desired physical orientation prior to adjusting the display orientation. Thus, for example, the user can adjust the orientation as follows: Initially, the user can experiment with multiple different device orientations and gripping methods until a comfortable position is found. Once such a position is found, the user can simply touch the orientation-independent rotation icon 80 and then select the arrow that points to the top of the screen.

This method provides significant advantages over menu-based methods for adjusting the display orientation, such as the method used by the Apple Newton™ PDA device. With the Newton device, the user selects one of the three following possible display rotation options from a drop down menu: (a) a counter-clockwise arrow together with the word "left," (b) a clockwise arrow together with the word "right," or (c) a relatively long clockwise arrow together with the term "180°." One problem with the Newton method is that it essentially requires the user to hold the device in the "original" orientation (to maintain the readability of the drop-down menu) as the display orientation is adjusted. Another problem is that the user must mentally identify and then select the display rotation option that corresponds to the planned device rotation. The present method of adjusting the display orientation overcomes these limitations.

Figure 19:
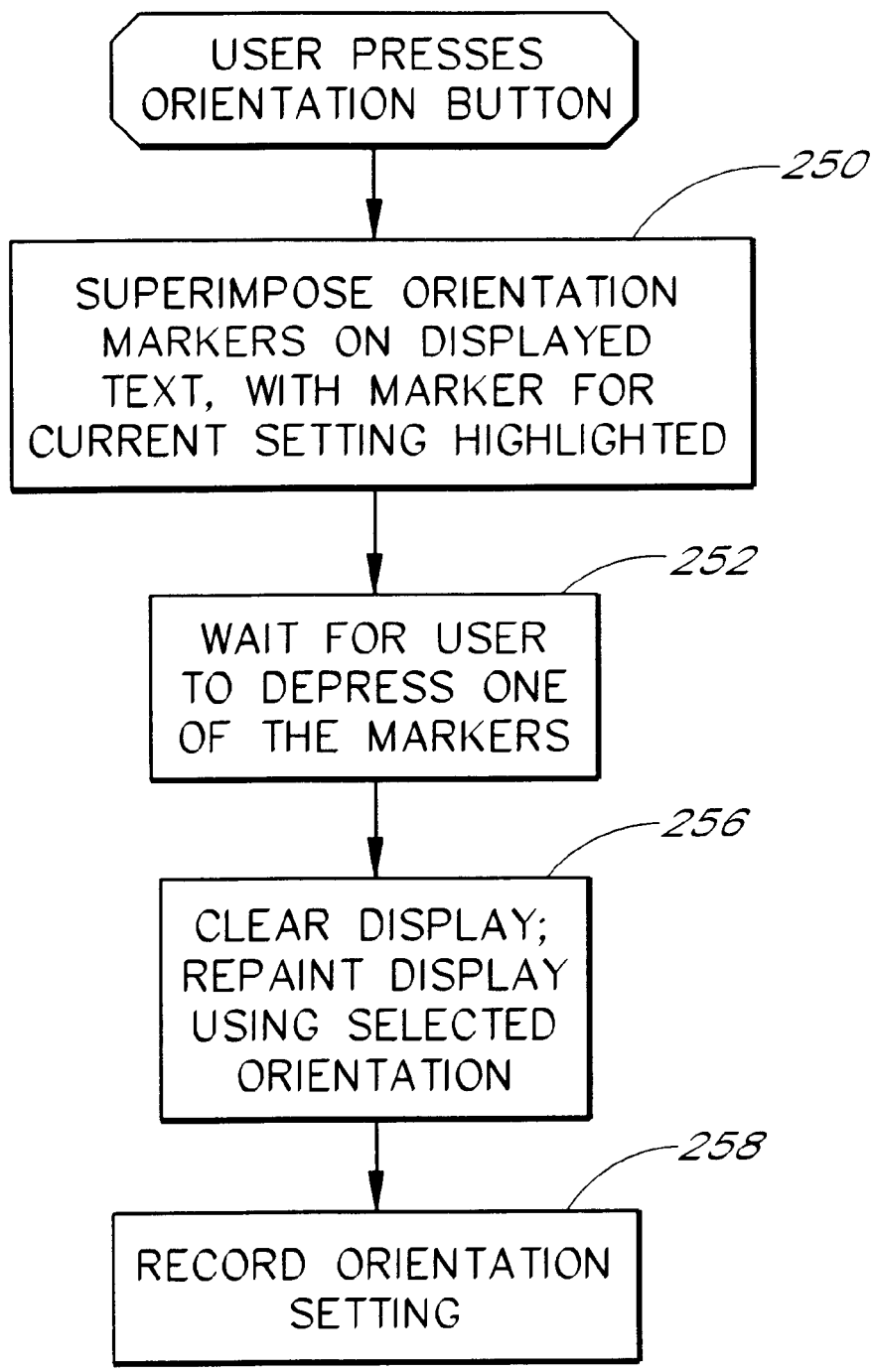
FIG. 19 illustrates a sequence of program steps that are performed by the device to implement the screen orientation feature.

FIG. 19 illustrates the steps that are performed when the user touches the orientation key 80. The program initially superimposes the orientation markers on the screen as in FIG. 17 (step 250), and then waits until one of the markers is touched (step 252). Upon detecting such a touch event, the program clears the display, repaints the display using the selected orientation setting, and records the setting in memory (steps 256 and 258).

Another feature of the reader device 30 is that it automatically resets the orientation to the base setting (as in FIG. 18) when the device is placed in the cradle 32. This facilitates the viewing of information while the device is in the cradle. In one embodiment, the reader device can be configured by the user to automatically return the orientation to its pre-cradle setting upon removal of the device from the cradle.

The device 30 preferably detects that it has been placed in or removed from the cradle 32 by a sensing a grounded pin on the cradle. Upon detecting the grounded pin, the device 30 executes a service routine the records the current orientation setting and then resets the orientation to the base setting. A similar routine may be executed upon removal of the device from the cradle to restore the orientation to the prior setting.

Although this invention has been described in terms of certain preferred embodiments, other embodiments that are apparent to those of ordinary skill in the art are also within the scope of this invention. Accordingly, the scope of the present invention is intended to be defined only by reference to the appended claims. In the claims which follow, reference characters used to designate claim steps are provided for convenience of description only, and are not intended to imply any particular order for performing the steps.

What is claimed is:

1. A method of facilitating the adjustment of an orientation of content that is displayed on a touch-sensitive display of a hand-held computing device, the touch-sensitive display having four edges, the method comprising:

providing an orientation key which comprises a generally orientation-independent graphical image depicting a function associated with the key;

in response to actuation of the orientation key by a user while viewing content on the display, displaying a plurality of graphical orientation markers on the display, each orientation marker corresponding to a respective orientation setting and graphically indicating a target top edge of the display; and in response to selection of one of the markers by the user, clearing the plurality of orientation markers from the display and adjusting the orientation of the content to a setting which corresponds to the selected marker;

wherein the method facilitates the ability of the user to select a desired physical device orientation prior to selecting a new display orientation.

2. The method of claim 1, wherein the step of displaying a plurality of orientation markers comprises displaying a plurality of arrows, each arrow pointing to a different respective edge of the display.

3. The method of claim 2, wherein the step of displaying a plurality of arrows comprises displaying four arrows.

4. The method of claim 3, wherein the step of displaying the four arrows comprises displaying one of the arrows in a highlighted form to indicate a current orientation setting.

5. The method of claim 1, wherein the step of displaying a plurality of orientation markers comprises superimposing the markers on the displayed content.

6. The method of claim 1, wherein the step of displaying a plurality of orientation markers comprises positioning each marker adjacent to a respective edge of the display.

7. The method of claim 1, wherein the step of providing an orientation key comprises providing an orientation-independent fixed icon on the touch-sensitive display.

8. The method of claim 1, wherein the hand-held device is adapted to be placed within a cradle that connects to a general purpose computer, and wherein the method further comprises:

responding to placement of the device within the cradle by automatically adjusting the display orientation from a first setting to a second setting, the second setting facilitating the viewing of content while the device is in the cradle.

9. The method of claim 8, further comprising responding to removal of the device from the cradle by restoring the orientation to the first setting.

10. A method adjusting a display orientation of content that is displayed on a touch-sensitive display of a hand-held computing device, the touch-sensitive display having four edges, the method comprising:

touching an orientation key of the hand-held device to cause a plurality of graphical markers to be displayed on the display with the content, each marker corresponding to a respective orientation setting and graphically indicating a target top edge of the display; and touching one of the plurality of markers to cause the device to automatically adjust the orientation of the content to a setting which corresponds to the touched marker.

11. The method of claim 10, wherein the orientation key and the markers are orientation-independent, and the step of touching the orientation key is performed after the hand-held device has been rotated to a new physical orientation.

12. The method of claim 10, wherein each marker comprises an arrow which points to a respective edge of the display, and the step of touching a marker comprises touching an arrow that points to a desired top edge of the display.

13. The method of claim 10, wherein the hand-held device is adapted to be placed within a cradle that connects to a general purpose computer, and wherein the method further comprises placing the device in the cradle to cause the device to automatically adjust the display orientation from a first setting to a second setting, the second setting facilitating the viewing of content while the device is in the cradle.

14. A hand-held computing device that is adapted to be used to read literary works, comprising:

a housing which supports a processor, memory, and a touch-sensitive display, the touch-sensitive display having a generally rectangular configuration;

an orientation key supported by the housing; and at least one literary title stored within the memory;

wherein the processor is programmed to respond to selection by the user of the orientation key during viewing of the title by displaying a plurality of graphical orientation markers on the display, each orientation marker corresponding to a respective orientation setting and graphically indicating a target top edge of the display;

and wherein the processor is programmed to respond to selection of one of the markers by the user by clearing the plurality of orientation markers from the display and adjusting the orientation of the title to a setting which corresponds to the selected marker.

15. The hand-held computing device of claim 14, wherein the housing has a rounded gripping portion which extends along one edge of the display, the gripping portion adapted to be used to grip the device in multiple device orientations.

16. The hand-held computing device of claim 15, wherein the gripping portion houses a battery.

17. The hand-held computing device of claim 14, wherein the plurality of markers comprise a plurality of arrows, each arrow pointing to a different respective edge of the display.

18. The hand-held computing device of claim 14, wherein each arrow is positioned on the display adjacent to a respective edge of the display.

19. The hand-held computing device of claim 14, wherein the orientation key comprises a fixed orientation-independent icon on the touch-sensitive display.

20. The hand-held computing device of claim 14, wherein the housing is adapted to be placed within a cradle that electrically connects the device to a general purpose computer, and wherein the processor is programmed to responding to placement of the device within the cradle by automatically adjusting the display orientation from a first setting to a second setting, the second setting facilitating the viewing of content while the device is in the cradle.

* * * * *